United States Patent
Herding et al.

(10) Patent No.: US 11,529,576 B2
(45) Date of Patent: Dec. 20, 2022

(54) FILTER ELEMENT

(71) Applicant: Herding GmbH Filtertechnik, Amberg (DE)

(72) Inventors: Walter Herding, Amberg (DE); Urs Herding, Amberg (DE); Martina Marx, Amberg (DE); Stefan Hajek, Amberg (DE)

(73) Assignee: HERDING GMBH FILTERTECHNIK, Amberg (DE)

( * ) Notice: Subject to any disclaimer, the term of this patent is extended or adjusted under 35 U.S.C. 154(b) by 817 days.

(21) Appl. No.: 16/086,180

(22) PCT Filed: Mar. 14, 2017

(86) PCT No.: PCT/EP2017/055977
§ 371 (c)(1),
(2) Date: Sep. 18, 2019

(87) PCT Pub. No.: WO2017/157930
PCT Pub. Date: Sep. 21, 2017

(65) Prior Publication Data
US 2020/0298154 A1  Sep. 24, 2020

(30) Foreign Application Priority Data
Mar. 18, 2016 (DE) .......................... 102016105104.7

(51) Int. Cl.
*B01D 39/00* (2006.01)
*B01D 39/16* (2006.01)
*B29C 67/00* (2017.01)

(52) U.S. Cl.
CPC .. *B01D 39/1661* (2013.01); *B01D 2239/1208* (2013.01); *B01D 2239/1291* (2013.01)

(58) Field of Classification Search
USPC ...................................................... 210/500.1
See application file for complete search history.

(56) References Cited

U.S. PATENT DOCUMENTS

| 5,651,931 A | 7/1997 | Bailey et al. |
| 5,804,074 A * | 9/1998 | Takiguchi .......... B01D 46/2407 |
| | | 210/497.01 |
| 2016/0024269 A1 | 1/2016 | Senoz et al. |

FOREIGN PATENT DOCUMENTS

| EP | 0393374 B1 | 10/1990 |
| EP | 0729774 A2 | 2/1996 |
| JP | 2002035518 A | 2/2002 |
| WO | 2017157930 A1 | 9/2017 |

OTHER PUBLICATIONS

PCT/EP2017/055977 Translation of International Search Report, dated Jul. 6, 2017, 2 pages.
PCT/EP2017/055977 German International Search Report and Written Opinion dated Jul. 6, 2017, 10 pages.
Application No. DE 10 2016 105 104.7 Research Report (Rechercheberichт) dated Oct. 24, 2016, 6 pages.

* cited by examiner

*Primary Examiner* — Allison G Fitzsimmons
(74) *Attorney, Agent, or Firm* — Boisbrun Hofman, PLLC

(57) ABSTRACT

The invention relates to a filter element having inherent stability and being porous to permit flow therethrough, comprising a filter body which forms a porous sintered structure and is constructed with filter body particles which are at least in part polysulfide particles. In addition, the invention relates to a method of manufacturing such a filter element.

27 Claims, 5 Drawing Sheets

FILTER ELEMENT

CROSS-REFERENCE TO RELATED APPLICATIONS

This application is the National Stage of, and therefore claims the benefit of, International Application No. PCT/EP2017/055977, entitled "FILTER ELEMENT" and filed on Mar. 14, 2017, which claims priority to German Patent Application No. DE 10 2016 105 104.7, filed on Mar. 18, 2016. The above applications are commonly assigned with this National Stage application and are each incorporated herein by reference in their entireties.

BACKGROUND

Subject matter of the invention is a filter element having inherent stability and being porous to permit flow therethrough, which comprises a filter body made of sintered plastics.

There is known an inherently stable flow-porous filter element which consists of polyethylene particles that are sintered together. Polyethylene particles become sticky on their surface at temperatures from 160 to 180° C., so that the temperature of continuous use of the known filter element is low. As early as below 80° C. there is the beginning of a temperature range in which continuous use is no longer appropriate because of permanent plastic deformations.

It has been considered to make the filter body from a more temperature-resistant plastic in order to achieve higher temperatures of continuous use for the filter element. However, temperature-resistant high-performance plastics are known to sinter very poorly or not at all to a porous solid structure. Because of this, common high-performance plastics are usually not sintered, but shaped otherwise, e.g. by injection molding or extrusion. In so far as sintering processes for high-performance plastics were considered in single cases, it was deemed indispensable to perform these sintering processes under pressure in order to produce a coherent and mechanically stable sintered structure. However, this reduces the porosity of the resulting sintered structure in a manner that no longer makes sense for filter applications.

The document WO 2005/053818 A1 therefore suggests for the production of a porous filter body of temperature-resistant plastics for achieving the desired temperature resistance, not to sinter the filter body particles used as starting material, but to glue them together with the aid of an adhesive in order to obtain a porous filter body structure. The filter body is constructed with first material particles of a high-performance plastics and second particles of a granular plastics starting material, which by mixing are brought into a state in which the adhesive bonding can be carried out by heating to the bonding temperature. Upon reaching a temperature near the bonding temperature, the granular plastics starting material of the second particles changes into a fluid state and forms adhesion-bonding nodes at the points of contact of the first material particles, whereas the other spaces between the first material particles are substantially free from adhesive. The adhesive may be either of the thermosetting type or of the thermoplastic type.

The documents JP H 8-168620 and JP 2002-336619 reveal suggestions to produce a sintered filter element on the basis of polysulfone.

It has been suggested in JP 2002-35518 to use polyphenylene sulfide compounds as starting material for producing a sintered filter element on the basis of polyphenylene sulfide. For preparing the starting material, polyphenylene sulfide is melted together with suitable fillers and homogeneously mixed to form a compound. It is reported that, with a suitable choice of the compound composition and grinding of the starting material into granules having a suitable grain size, porous plates could be made by sintering. There is nothing known about the mechanical stability of these sintered plates. However, it is also reported that the sintering process fails as soon as unfilled polyphenylene sulfide is added to the starting material.

It is the object of the present invention is to indicate a filter element which can be used at elevated operating temperatures and which still is hydrolysis-resistant even at elevated operating temperatures. The filter element, in particular, should be inherently stable and have sufficient strength to permit cleaning thereof in the counterflow process by pressurized air pulses. In addition, a manufacturing method for such a filter element is to be indicated.

The invention suggests a filter element having inherent stability and being porous to permit flow therethrough, comprising a filter body which forms a porous sintered structure and is constructed with filter body particles which are at least in part polysulfide particles.

Sintering designates to a kind of forming a sintered structure from individual particles into a solid body under the action of heat. The starting material for forming a solid body with sintered structure is usually in powder form, i.e. composed of individual starting material particles. In sintering, the starting material in powder form connects, and a coherent solid body structure, the sintered structure, emanates from the starting material particles. The formation of the sintered body, in particular its structure, can be controlled by sintering temperature and sintering time. During sintering, the initially powdery material solidifies mainly by diffusion, i.e. migration of atoms of individual starting material particles in contact with each other via a contact location into a respective adjoining starting material particle, and recrystallization, i.e. new crystal formations at work-hardened locations of the sintered structure. Sintering permits the production of molded parts or semi-finished products. In general, metals and ceramics are sintered, but it is also possible to sinter certain plastics, in particular simple thermoplastics such as polyethylene. In most cases, the starting material in powder form is subjected to pressure prior to sintering, so that it assumes a desired shape and is also compressed. The compression increases the contact area with other powder particles. This enhances the sintering process and even makes the same possible at all in many cases, because the sintering process is favored by an as large as possible number of contact points between the individual starting material particles. This is an important prerequisite for the ability of a material to form a sintered structure, because the driving force behind the sintering process is to reduce the energy required to maintain the interface by reducing the surface area. For these reasons, it is also favorable for forming a mechanically stable sintered structure to exert pressure on the material to be sintered during the sintering process. However, sintering under pressure is less suitable for the production of solid bodies that are porous or even porous so as to permit the flow of fluids therethrough, as the formation of pores is suppressed by the pressure exerted during the sintering process. For forming filter bodies by means of sintering processes, the exertion of pressure therefore should be avoided during the sintering process. As a rule, the process is performed such that the starting material in powder form is not subjected to pressure, but is filled into a sintering mold which is vibrated while the powder is filled in, so that the powder particles assume a reasonably dense packing. Thus, during sintering, a porous filter can be created which allows the flow of a fluid phase—in particular gas or liquid—therethrough.

The filter body is to be constructed of the sintered-together filter body particles. This means that the filter body particles during the sintering process form a mechanically stable sintered structure with each other that is porous to permit flow therethrough. This does not exclude that additives and/or fillers are present in addition, which are incorporated in the sintered structure or are incorporated into the sintered structure during the sintering process. However, the fillers should not themselves form the sintered structure, but rather the sintered structure should in essence be constructed by the filter body particles. The invention thus suggests that the sintered structure of the filter body is completely or at least in part formed with polysulfide particles. This provides for the improved temperature resistance and hydrolysis resistance as compared to known filter elements with filter bodies made of plastics. The higher the proportion of polysulfide particles in the sintered structure, the more temperature-resistant and/or hydrolysis-resistant the filter element can be.

The polysulfide in particular may be an organic polysulfide. Above all, polyaryl sulfides are feasible. Polysulfides are a group of chemical compounds containing chains of sulfur atoms. Organic polysulfides are organic compounds containing as functional group sulfur in the form of a sulfur-sulfur bond. In case of polyaryl sulfides, such as polyphenylene sulfide, aromatic monomers are linked together via sulfur atoms.

The polysulfide in particular may be a polyphenylene sulfide. Polyphenylene sulfide is known by the abbreviation PPS and is sometimes also referred to as poly(thio-p-phenylene). It has the general formula $(SC_6H_4)_n$ and belongs to the high-temperature resistant plastics. Polyphenylene sulfide is a partially crystalline high-performance plastic and in principle belongs to the thermoplastic plastics materials. The combination of aromatic monomer units via sulfur atoms leads to the creation of particularly resistant polymers, the good mechanical properties of which are retained even at temperatures well above 200° C., so that continuous use is possible up to 240° C., depending on the load. For a short time, polyphenylene sulfide also withstands temperatures up to 270° C. Moreover, it is chemically resistant to almost all solvents, many acids and alkalis and also exhibits limited resistance to atmospheric oxygen even at high temperatures. Polyphenylene sulfide usually has the following material properties: density: approx 1350 kg/m$^3$; water absorption at 23° C.: <0.05%; tensile modulus: approx. 3000 MPa; melting point DSC (at 10° C./min): 280° C., this may vary between 275° C. and 290° C.

Polysulfides, in particular polyaryl sulfides are normally produced as thermoplastics. For example, there exists linear polyphenylene sulfide and branched polyphenylene sulfide. In branched polyphenylene sulfide, the branched polymer chains are reversibly linked to each other by physical crosslinking points. In linear polyphenylene sulfide, the chains exhibit little branching and accumulate to form highly ordered superstructures. Linear polyphenylene sulfide can be formed into components by blow molding, extrusion or injection molding. About 80% of the components of linear polyphenylene sulfide are formed by injection molding. Branched polyphenylene sulfide permits processing in a much more limited extent. Mostly, it permits only injection-molding and can be extruded to a very limited extent only. It is also possible to produce most polysulfides, in particular polyaryl sulfides such as polyphenylene sulfide, in a crosslinked configuration which has a thermosetting character. However, such configurations technically play only a minor role because of their considerably more difficult processability.

Polysulfides, and thus also polyphenylene sulfide, are not known to be particularly good sinterable substances. The inventors have now succeeded for the first time to produce even inherently stable porous sintered structures from polysulfide filter body particles, in particular from unfilled polysulfide filter body particles, which have open pores in such a way that they permit the passage of fluid therethrough. Filter bodies of these polysulfide sintered structures are suitable for use as inherently stable lamellar filter elements. The filter elements even have sufficient mechanical stability to permit filter cleaning by means of pressurized air pulses, as it is frequently practiced in filter devices, in particular by repeatedly subjecting the filter elements to cleaning according to the counterflow principle.

The filter elements may comprise a filter body constructed of filter body particles, which is constructed to a large part or even in essence of polysulfide particles. In particular, all filter body particles may contain polysulfide. At least a portion of the filter body particles may even consist entirely of polysulfide, i.e. at least a portion of the filter body particles may contain polysulfide to 100%. It is even conceivable that all filter body particles consist of polysulfide, i.e. that all filter body particles contain polysulfide to 100%. If it is stated here that all filter body particles are polysulfide particles or consist of polysulfide, this means that the sintered structure of the filter body is composed of polysulfide particles, apart from additives which, although incorporated into the sintered structure, are not part of the powdery starting material that forms the sintered structure of the filter body. It follows therefrom that such additives do not contribute significantly to the construction of the sintered structure from the powdery starting material particles.

Certain embodiments of the filter element may comprise a filter body constructed of polysulfide particles containing at least two polysulfides of different configurations. On the one hand, individual ones of the polysulfide particles may contain at least two polysulfides of different configuration. On the other hand, the filter body may be constructed with first polysulfide particles containing a first configuration polysulfide and second polysulfide particles containing a second configuration polysulfide. Both variants can also occur in combination. Of course, in all variants further polysulfides with different configurations may be present in addition to the first and the second polysulfide. When reference is made to polysulfides with different configurations, this is to be understood as any configuration of a polysulfide that is different from other configurations thereof. Two polysulfides of different configurations may well be of the same polysulfide type but in different configurations, for example in the form of two polyphenylene sulfides which each have different configurations. For example, one and the same polysulfide type (such as polyphenylene sulfide) may be present once in a purely thermoplastic configuration and once in an already more crosslinked configuration that already exhibits thermosetting properties.

The polysulfide particles contain in particular unfilled polysulfide or are in particular unfilled polysulfide particles. By this is meant that the polysulfide starting material for the production of the sintered structure is a polysulfide which is not subjected to a treatment as is generally known by the term "compounding". This means, in particular, that no additives, admixtures, fillers, auxiliary agents, fibers or the like are incorporated into the polysulfide raw material for producing the polysulfide particles which form the starting material for producing the sintered structure. However, the polysulfide starting material for producing the sintered structure may indeed be a treated polysulfide raw material, for example, a mechanically treated polysulfide for producing a suitable grain size of the polysulfide particles as the starting material for the sintering process and/or a thermally treated polysulfide raw material, as described in more detail below. It has been found experimentally that it is possible to produce stable sintered structures with a proportion of 50% and more of unfilled polysulfide particles, in particular to produce sintered structures from completely unfilled polysulfide particles. This means that the filter body can contain up to 100% polysulfide particles.

It has been established experimentally that the sintering of polysulfide particles into an inherently stable and porous sintered structure for a filter body is enhanced when polysulfide particles containing a tempered polysulfide are sintered. During tempering, the polysulfide, for example in the form of granules, is heated for a longer period of time to a temperature below the melting temperature. The sintered structure of the filter body then forms from polysulfide particles containing the tempered polysulfide. When polysulfides such as polyphenylene sulfide are sintered in the untempered state, it can be seen that only a very small window of suitable temperatures is available at which an inherently stable sintered structure is formed at all. In the case of polyphenylene sulfide, for example, this temperature window is only 3° C., namely from 300 to 303° C. When, on the other hand, tempered polysulfide particles are sintered, this window of suitable sintering temperatures, at which an inherently stable sintered structure can be achieved which, moreover, even has porous properties, increases considerably, for example to above 60° C. in the case of polyphenylene sulfide. In addition, it is found that the mechanical properties of the resulting sintered bodies, in particular their brittleness and fragility, are markedly better than those of sintered bodies made of untempered polysulfide starting material. The tempering of polysulfide particles can be carried out in particular in a circulating air oven in the presence of an oxidizing agent. The oxidizing agent may in particular be oxygen, e.g. atmospheric oxygen. Other oxidizing agents are also conceivable, for example sulfur or organic oxidants. Typically, after tempering the polysulfide, a certain melt flow index reduction is observed. The melt of the tempered polysulfide is thus as a rule much more viscous than the melt of pure polysulfide. Typical temperatures during tempering may be slightly below the melting point or melting range of polysulfide, e.g. between 175° C. and 280° C. in the case of polyphenylene sulfide. The higher the temperature, the shorter the tempering time may be selected in general. However, the temperature should always be at least so far below the lowest melting temperature that sticking together or clumping of the filter body particles during the tempering process is avoided. The powdery mixture of filter body particles should remain powdery and pourable even after the tempering process. In particular, it is favorable when the particle size distribution of the filter body particles does not change significantly during the tempering process. Often there can be observed a change in color of the polysulfide particles during the tempering process. For example, originally white to yellowish polyphenylene sulfide particles take on a brownish to brown color after tempering.

It has been found that particularly good conditions for the sintering of the filter body particles can be achieved when the tempered polysulfide particles have been subjected to the tempering process for a period of time between 60 min and 24 hours. In particular, good sintering conditions are present for tempered polysulfide particles which have been subjected to the tempering process between 2 hours and 12 hours, in particular between 11 hours and 12 hours; as already mentioned, it holds that shorter tempering times can be chosen the higher the temperature during tempering is chosen. With tempering times between 11 and 12 hours, in the case of filter particles of pure polyphenylene sulfide, a temperature at the upper limit of the range indicated is suitable, for example between approximately 260° C. and 280° C., in particular approximately 270° C.

It is assumed that tempering causes an increase in the molecular weight of the tempered material because molecular chains branch and/or elongate. In addition, it appears to be beneficial when the tempering is carried out in an oxidative environment. One then speaks of thermooxidative molecular weight increase of the material of the filter body particles. It is conceivable that under these conditions, an originally thermoplastic plastics material, such as polyphenylene sulfide, adopts properties that are more characteristic of thermosetting plastics.

Surprisingly, it has been shown that particularly strong sintered structures, which at the same time can be repeatedly subjected to loads, can be produced when the polysulfide particles contain at least one tempered polysulfide and at least one untempered polysulfide. For example, the polysulfide particles may comprise a mixture of first filter body particles having the configuration of a tempered polysulfide, in particular a tempered polyphenylene sulfide, and second polysulfide particles having the configuration of an untempered polysulfide, in particular an untempered polyphenylene sulfide. The two polysulfides then can cooperate in such a way that the structure of the resulting porous sintered structure is determined in essence by the tempered polysulfide, whereas the untempered polysulfide provides for fast and firm bonding of the filter body particles to one another.

Furthermore, it has been found that good sintering results can be achieved when the filter body particles subjected to the sintering process have a melt flow index of at the most 500 g/10 min, in particular of at the most 250 g/10 min, in particular of at the most 100 g/10 min. The melt flow index indicates how many grams of molding compound, during 10 minutes, are pressed through a standardized nozzle during a standardized extrusion process after melting of the filter body particles. This process is specified in ASTM D 1238-13, Procedure B, in particularly with regard to the temperature and the load acting on the molding compound to be extruded. The values indicated refer to the state of the polysulfide particles immediately before the beginning of the sintering process, i.e. in case of polysulfide particles of tempered polysulfide, to the polysulfide particles in the tempered state.

There can be sufficiently inherently stable filter elements achieved with a filter body the porosity of which is at least 30%. It is even possible to achieve porosities of at least 50%, and even up to 70%.

In particular, it has been found that filter elements can be produced in which the filter body is designed such that, in a fluid flow without foreign matter load, a pressure loss across the filter body, as measured with respect to an air flow without foreign matter load at a volumetric flow rate of 12.011 m$^3$/(m$^2$×min) and with an air flow-through area of the filter body of 256 mm×256 mm with a thickness of 4 mm, of at the most 2000 Pa can be determined, in particular of at the most 1000 Pa, in particular between 100 and 2000

Pa. The detection of the pressure loss takes place here when fluid without foreign matter load is flown towards a filter element in order to exclude a pressure loss that steadily increases by an increasing occupancy of the filter surfaces with foreign matter in realistic operation.

The filter element in particular can be made of polysulfide particles having an average size of 50 to 500 μm, in particular of 100 to 350 μm. By size is meant here the average size of the polysulfide particles immediately before the beginning of the sintering process. In the case of tempered polysulfide particles, this is thus the average size of the polysulfide particles after the tempering process.

As already mentioned, it is quite conceivable that the filter body in addition to the polysulfide particles still has further constituents. Such further constituents may be organic and/or inorganic substances. For example, hollow glass globules can be mentioned in the sense of an inorganic constituent of the filter body, which may serve for example to reduce the weight of the filter body. In addition, the filter body may contain additional mineral substances, e.g. silicon oxides, calcium compounds, aluminum oxides. Organic constituents are also conceivable, for example polytetrafluoroethylene (PTFE) particles. Furthermore, the filter body may contain soot particles against static charge. Such additional constituents may be present in the filter body between the polysulfide particles forming the sintered structure. The additional constituents as a rule are admixed to the polysulfide starting particles prior to the beginning of the sintering process, so that they are then incorporated in the filter body while the sintered structure is gradually formed. In the filter body, the proportion of particles forming the sintered structure will generally dominate over the other constituents. For example, between 50% and 100% based on the mass of the filter body may be formed by the polysulfide particles. Accordingly, the further constituents will generally constitute between 50% and 0% with respect to the mass of the filter body, and often will even constitute significantly less than 50%, in particular will be in the range between 0% and 20% or even between 0% and 10% with respect to the mass of the filter body.

The filter body may be provided with a coating applied on an inflow surface of the filter element. The coating can be constructed with particles. In particular, the coating will have a smaller pore size than the filter body. Such a coating is to achieve surface filtration so that solid particles to be filtered out by means of the filter element do not enter the interior of the filter element. Such a coated filter element can be cleaned off much more easily by counterflow cleaning than an uncoated filter element. In particular, the coating may contain a non-stick material, for example PTFE particles.

There may be several filter elements according to the invention installed in a filter system, for example in a common carrier parallel to each other in such a way that a clean fluid space on one side of the filter elements is separated from a raw fluid space on the opposite side of the filter elements. Normally, a suction fan then is arranged on the clean fluid side downstream of the filter elements. Furthermore, there is normally present a device for the counterflow pressure-surge cleaning of the filter elements, which is designed such that the filter elements can be subjected to pressurized air surges from the clean fluid side.

It has been found experimentally that filter elements can be produced in the manner described herein, comprising a filter body which, in a tensile test based on DIN EN ISO 527-2 (2012-06) at a test speed of 80 mm/min, has a tensile strength of at least 1 N/mm$^2$, in particular of at least 2 N/mm$^2$, in particular at least 4 N/mm$^2$, and in particular between 1 N/mm$^2$ and 25 N/mm$^2$. In this case, the elongation at break of the filter body in this tensile test is at least 0.2 mm, in particular at least 0.5 mm, in particular at least 1 mm, and in particular between 0.2 mm and 10 mm.

The filter element can be designed in particular as an inherently stable lamellar filter element that is porous to permit flow therethrough.

The filter element may have a filter head molded onto the filter body. The filter head mainly serves for attaching or holding the filter element in a filter device. For this reason, the filter head should ensure sufficient mechanical stability and be designed such that it can accommodate the entire filter element and possibly also the operating loads, such as those caused by pressurized air surges during cleaning off. The filter head does not necessarily have to be flow-porous to the same extent as the filter body. It may also be not porous at all. Much more important is mechanical stability for the filter head and its connection to the filter body. The filter head can be connected to the filter body by means of a temperature-resistant adhesive. The filter head can also be integrally formed on the filter body in any other way, e.g. as prepreg, by casting or by injection molding. The filter head may be made in particular of sintered high-temperature plastics or may be manufactured as an injection molded part of high-temperature plastics. In the case of the filter element according to the invention, it may be provided, in particular, that the filter head also contains a polysulfide, in particular contains the same polysulfide as the filter body. It is particularly favorable when the filter head is made of the same material as the filter body or of a material that is similar to the material of the filter body. For, by using the same or at least similar materials for filter head and filter body as far as possible, the thermal expansion behavior of all parts of the filter element can be coordinated. The occurrence of stresses under thermal load can thus be suppressed. The effect utilized in this regard is that polysulfides, such as polyphenylene sulfide, can be processed by conventional plastics shaping or molding processes. For example, a filter head made of polyphenylene sulfide can be molded to a filter body of sintered polyphenylene by injection-molding.

If the filter element, in addition to a filter head, also comprises a filter foot molded to the filter body, this filter foot may also contain the polysulfide and in particular may be made of the same material as the filter body.

It is possible to produce a sintered filter element which is designed for a temperature of continuous use, which is a temperature in the range from 50 to 200° C., in particular from 80 to 200° C., in particular from 100 to 200° C., in particular from 120 to 200° C. In this regard, not every embodiment of the filter element has to be suitable for the entire temperature range from 50 to 200° C. However, any temperature-resistant embodiment should have a maximum temperature of continuous use which at any concrete temperature is within the range from 50 to 200° C. The filter element described herein turns out to be particularly resistant to hydrolysis.

A further aspect of the present invention relates to a method of manufacturing a filter element having inherent stability and being porous to permit flow therethrough, said method comprising the steps of: providing filter body particles which are at least in part polysulfide particles, and sintering the filter body particles to a porous sintered structure to form a filter body of the filter element.

The polysulfide may be an organic polysulfide, in particular a polyaryl sulfide such as polyphenylene sulfide. All filter body particles may contain polysulfide. At least part of the filter body particles may even consist entirely of polysulfide. In some cases, even all of the filter body particles may consist of polysulfide. At least two polysulfides of different configuration can be used to construct the filter body.

Sintering of the filter body particles can be carried out at ambient pressure. This enhances the production of a porous sintered structure, which accordingly allows a high fluid flow rate for the filter body. In other words: the pressure loss occurring across the filter element during operation is comparatively low.

Good results for the mechanical properties of the sintered structure obtained can be achieved when sintering takes place at a temperature of 290° C. to 350° C., in particular at a temperature of 310° C. to 320° C. This holds in particular in the case that the polysulfide particles are polyphenylene sulfide particles.

Depending on the geometry and in the particular the thickness of the filter body, suitable sintering durations can be between 3 min and 180 min, in particular between 40 min and 100 min, in particular between 60 min and 80 min.

It has been found that in the case of filter body particles containing polysulfide, the sintering process is much easier to control when the polysulfide particles are subjected to a tempering process prior to sintering. During the tempering process, the polysulfide particles are exposed to an elevated temperature, which generally should be slightly less than the melting temperature of the polysulfide particles, or the lower limit of the melting range of the polysulfide particles. For example, it has been found to be beneficial to temper polysulfide particles at a temperature from 255° C. to 290° C., in particular from 265° C. to 275° C. Suitable durations for the tempering process are between 7 and 24 hours with the proviso that the higher the temperature is selected for the tempering process, the shorter the time required for the tempering process. Rather longer periods of time for the tempering process have proven to be particularly favorable when the temperature is set accordingly sufficiently far below the lowest melting temperature. For example, it has turned out that polysulfide particles can be sintered particularly well to form a mechanically stable flow-porous filter body when they have been previously tempered for 10 to 12 hours.

The tempering process should not lead to clumping or sticking together of the polysulfide particles. However, should a certain adhesion nevertheless be observed, it may be useful to subject the polysulfide particles after the tempering process to a loosening up procedure, for example by vibration. The particle size distribution of the polysulfide particles after tempering should therefore not differ greatly from the particle size distribution before tempering. For example, good results were obtained with an average size of 50 to 500 µm, in particular 100 to 350 µm, of the polysulfide particles before tempering.

It has turned out to be quite advantageous when at least two polysulfides of different configuration are used in the process to provide the polysulfide particles. For example, at least one tempered polysulfide and at least one untempered polysulfide may be used to provide the polysulfide particles. This can be effected e.g. such that a first configuration polysulfide (e.g. tempered polyphenylene sulfide) and a second configuration polysulfide (e.g. untempered polyphenylene sulfide) as starting materials are mixed with each other in order to form from the mixture polysulfide particles containing both the first configuration polysulfide as well as the second configuration polysulfide. It is also possible to provide first polysulfide particles containing a polysulfide of a first configuration (e.g. tempered polyphenylene sulfide) and to provide second polysulfide particles containing a polysulfide of a second configuration (e.g. untempered polyphenylene sulfide) and to then form the filter body by mixing the first and second polysulfide particles and sintering the same together. Both variants may also be combined and further constituents—with or without polysulfide of further configuration—can be added to the filter body particles or additional filter body particles—with or without polysulfide of further configuration—can be used.

As already mentioned, it is readily possible to add further components, in particular organic or inorganic components, to the polysulfide particles. The mixing of polysulfide particles and other components takes place after providing the polysulfide particles, but can indeed take place already before tempering. In cases where an undesirable change in the properties of the filler or additive is feared due to the tempering, the admixture of other components can also take place after tempering, so that a finished mixture is provided for performing the sintering process.

The method described may comprise furthermore applying a coating composed with particles, having a smaller pore size than the filter body, to an inflow surface of the filter element. This creates a filter element suitable for surface filtration.

The filter element described herein is suitable for virtually all filtering tasks where an arbitrary concrete temperature of continuous use in the temperature range indicated from 50 to 200° C. is required. It is particularly suitable for filtering combustion exhaust gases, especially in those cases where combustion exhaust gases occur at higher temperature. Further fields of application for product separation from a gas stream include fluid bed dryers, dryers in the food industry, spray dryers in the detergent industry, calcination furnaces, pyrogenic particle production. The filter element is also well suited for the recovery of valuable material from a gas stream, preferably for the recovery of catalyst in catalytic fluidized bed reactors and for exhaust gas purification, preferably in metal baths, metal melting furnaces, baths with liquid glass, clinker coolers, ovens in optical fiber production, roasting equipment in the food industry.

In addition to purifying exhaust gases, the filter element described herein is also suitable for use in filtering a liquid stream.

Concerning the selection of fillers and additives, attention is paid to the desired temperature resistance and/or resistance to hydrolysis.

The invention and particular embodiments of the invention will be explained in more detail in the following with reference to exemplary embodiments; in the drawings

BRIEF DESCRIPTION OF THE DRAWINGS

FIG. 5 shows a sectional view of the filter element at the position marked V-V in

FIG. 4;

DETAILED DESCRIPTION

Figure 1:
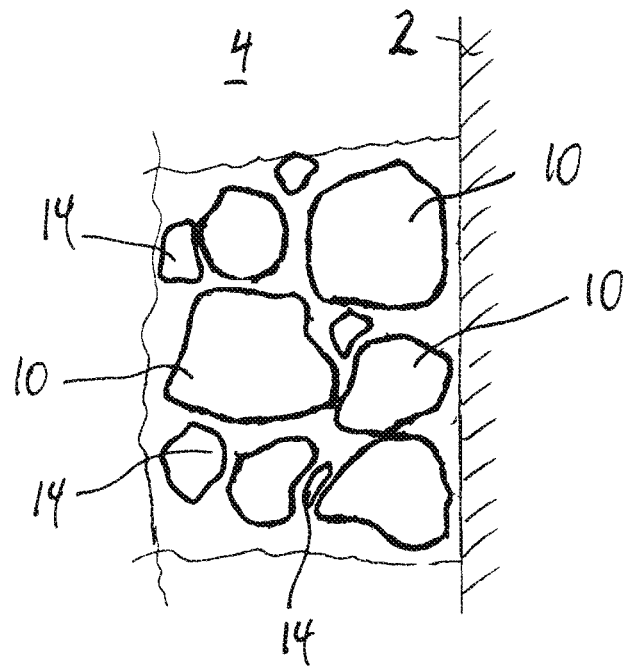
FIG. 1 shows a sectional view of a section of a filled mold, for the production of a filter element, illustrating the state before sintering.

FIG. 1 illustrates a section of a mold 2 enclosing a mold cavity 4. Filter body particles, in this case polysulfide particles 10, i.e. particles of a polysulfide material as described herein, have been introduced into the mold cavity 4. The filter body particles constitute the starting material for a filter body 12. In addition, FIG. 1 reveals hollow glass globules 14 which as fillers fill spaces between the polysulfide particles 10.

Figure 2:
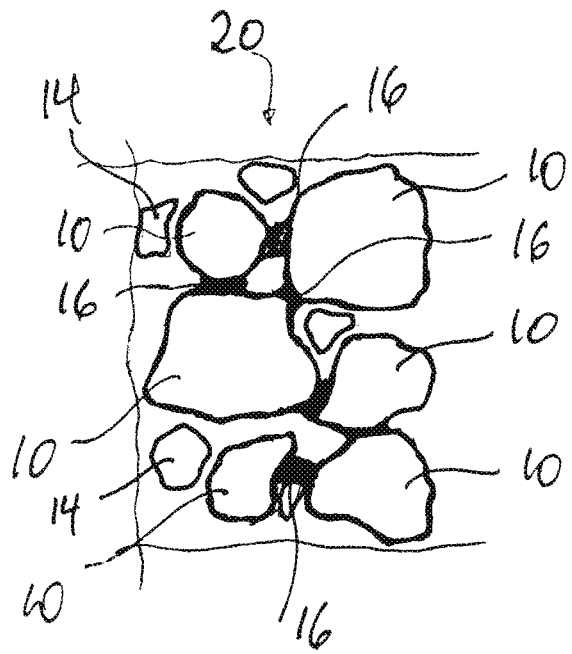
FIG. 2 shows a sectional view of a section of a filter element without surface coating.

FIG. 2 illustrates the state after vibration of the mold 2 and heating of the same to a sintering temperature for a suitable period of time. The polysulfide particles 10, at contact points between adjacent polysulfide particles 10, i.e. at locations where adjacent polysulfide particles 10 contact each other or almost contact each other, have formed sintering necks 16. At the sintering necks 16, the polysulfide particles 10 have grown together, so that a flow-porous sintered structure, i.e. a sintered structure that is porous to permit flow therethrough, is formed which constitutes a coherent, but still flow-porous filter body 20. Upon cooling of the filter body 20, the sintered structure thus produced forms an inherently stable solid structure, so that the now sintered together filter body 20 can be removed from the sintering mold 2 shown in FIG. 1 as well. FIG. 2 illustrates the filter body 20 after removal of the same from the opened sintering mold 2.

Figure 3:
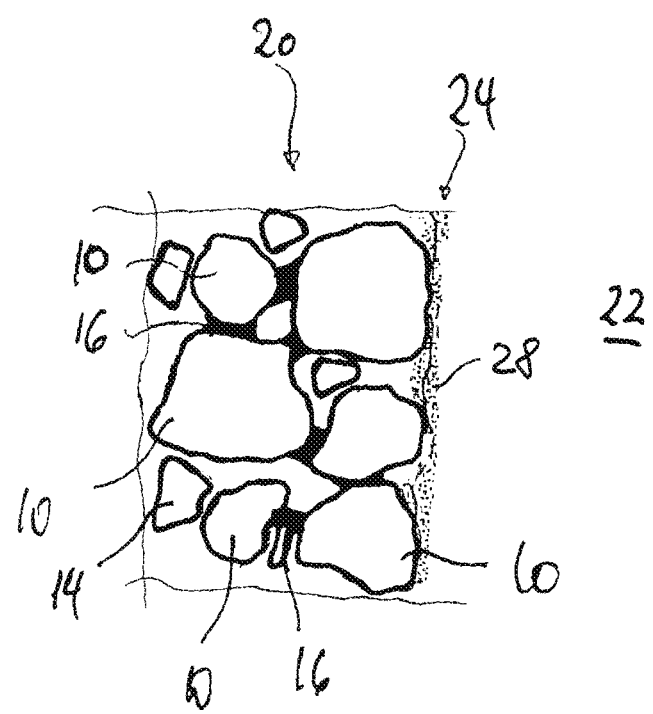
FIG. 3 shows a sectional view of a section of a filter element, after application of a surface coating.

FIG. 3 finally shows a state in which, after removal from the sintering mold 2, a coating 24 for surface filtration has been applied to the filter body 20 on a side 22, that is the right side in FIG. 3, which forms the inflow side during operation. The coating 24 contains fine-grain plastics particles 28. The plastics particles 28 typically have anti-stick properties and may be, for example, polytetrafluoroethylene particles. The average size of the plastics particles 28 may be between 0.3 and 30 μm, depending on the application. In the case of polytetrafluoroethylene particles, the particles form polytetrafluoroethylene agglomerates. The particles 28 can be applied, in particular, by first spraying an adhesive onto the relevant surface of the raw filter body 20 and then blowing on the particles 28. Alternatively, it is also possible to firstly blow on the particles 28 and then spray on a liquid adhesive. The coating can also be applied as a liquid, e.g. consisting of an aqueous emulsion of particles and adhesive. The adhesive may be a thermosetting plastic, which then cures at room temperature or at an elevated temperature.

The hollow glass globules 14 are optional. In principle, the filter body 20 could also be constructed of the polysulfide particles 10 only.

Figure 4:
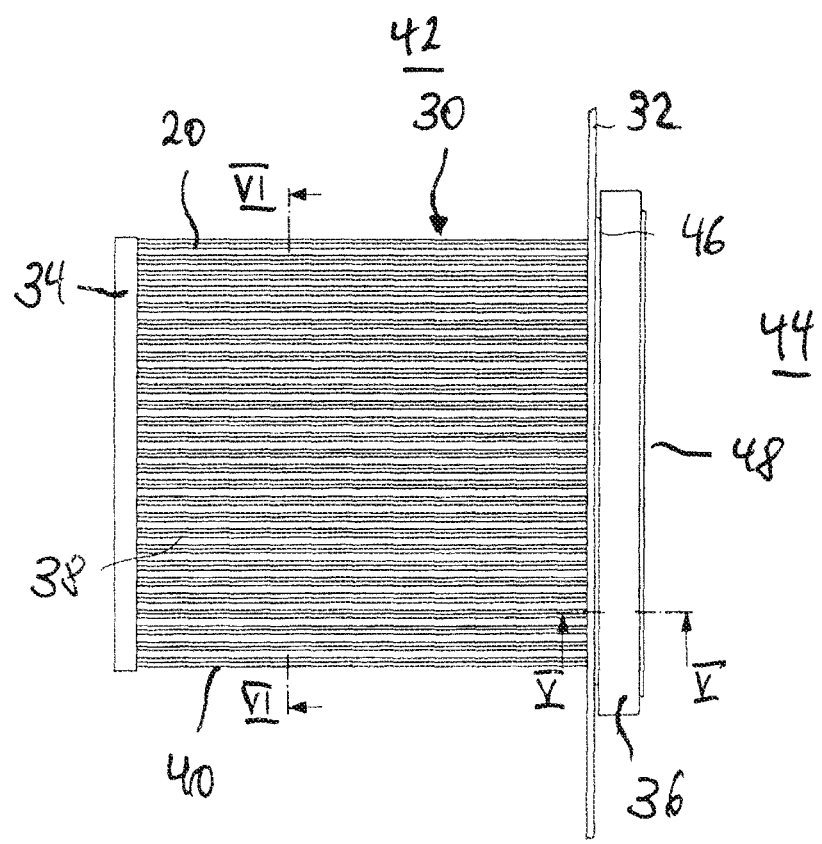
FIG. 4 shows an embodiment of a filter element according to the invention with a filter head which is held on an upright partition between raw fluid space and clean fluid space.

FIG. 4 shows a filter element 30 according to the invention, comprising a filter body 20 having the construction described hereinbefore, as well as a filter foot 34 integrally formed on the filter body 20 and a filter head 36 integrally formed on the filter body 20. The filter element 30 shown in FIG. 4 is held on a vertically arranged or upright partition 32, with the longitudinal direction of said filter element 30 between filter head 36 and filter foot 34 extending in the horizontal direction. FIG. 4 shows the filter element 30 as viewed in the direction towards one of two large, zig-zag-shaped or wavy first side walls 38. Narrow, second side walls 40 laterally connect the first side walls 38 to each other so as to form a box-like structure. The partition 32 is part of a filter device, not shown in more detail, and separates a raw fluid side 42 of the filter device from a clean fluid side 44.

The filter element 30 is "laterally" attached with its filter head 36 to the upright partition 32. FIG. 4 illustrates the so-called clean-fluid-side installation of the filter element 30, in which a lateral surface of the filter head 36 projecting beyond the side walls 38, 40 and facing towards the filter foot 34 is attached to the partition 32 on the clean fluid side 44, and the filter body 20 of the filter element 30 projects through an opening in the partition 32. Between the filter head 36 and the partition 32, there can be seen a seal 44 as a sealing member between the raw fluid side 42 and the clean fluid side 46. This permits replacement of the filter element 30 from the "clean" clean fluid side 44. Alternatively, the so-called raw-fluid-side installation of the filter element 30 is also possible, in which the filter head 36, with the lateral surface thereof opposite to the filter foot 34, is attached to the partition 32 from the raw fluid side 42. Installation and removal of the filter element 30 then take place via the raw fluid side 42. It is, of course, also possible to mount the filter element 30 in suspended form, instead of being attached laterally. The partition 32 is then provided transversely in the manner of an intermediate floor in the filter device between an e.g. lower raw fluid side 42 and an upper clean fluid side 44. Also in this suspended installation position of the filter element 30, there may be provided either a clean-fluid-side or raw-fluid-side installation of the filter element 30.

During operation of the device, the medium to be filtered is sucked into the device through an opening, not shown, or urged by positive pressure into the device and flows from the raw fluid side 42 through the porous side walls 38, 40 into the hollow interior of the filter element 30 and is sucked from there through a through-flow opening 48 in the filter head 36 onto the clean fluid side 44. From there, it is discharged through an opening, also not shown, back to the outside of the filter device. The solid particles to be separated from the medium to be filtered are retained by a fine porous layer on the surface of the filter element 30 and remain partially adhered thereto. This layer of adhering solid particles is cleaned off at regular intervals by blasting off, e.g. by a pressurized air surge which is opposite to the direction of flow, and then falls to the ground on the raw fluid side 42 of the device.

Figure 5:
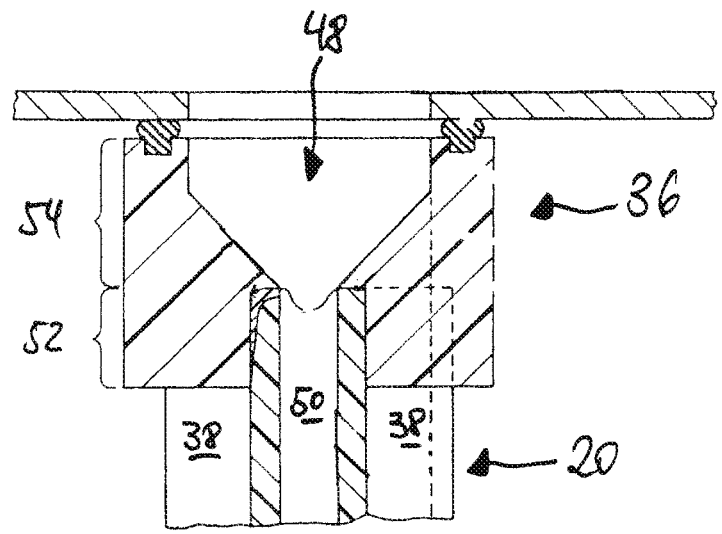

FIG. 5 illustrates the space 50 between the two first side walls 38 which is confined in zig-zag-like or wavy manner and continues in the flow passage 48 through the filter head 36 to the clean fluid side 44. In contrast to FIG. 4, FIG. 5 shows the installation of the filter element 30 on the raw fluid side.

The side walls 38 of the filter element 30 are flow-porous structures consisting of sintered together polysulfide particles 10 as described herein. On the upstream or inflow side of the filter element 30, there may be applied finer porous coating 24, for example, of finer-grain polytetrafluoroethylene particles, whereby the surface filtration properties can be controlled particularly well and can be adapted particularly well to the substances to be filtered.

The filter head 36 as well as the filter foot 34 are made of a plastic material which is matched to the polysulfide material of the filter body 20, and are integrally formed on the filter body 20, e.g. by injection molding. In the transition shown in FIG. 2 between the filter body 20 and the filter head 36, the side walls 38 of the filter body are enclosed on the outside by the filter head 36 with a first part 52 of its height, while a second part 54 of the height of the filter head 36 surmounts the side walls 38 upwardly and covers the same at the upper ends thereof. Thus, the connecting area between the side walls 38 and the filter head 36 becomes particularly large.

In principle, any synthetic resin is suitable for molding the filter head 36 and the filter foot 34 onto the side walls 38 of the filter element 30. However, it is particularly advantageous when the material of filter head 36 and filter foot 34, with respect to thermal stress, behaves as similar as possible as the material of the filter body 20. It is therefore recommended that the molded filter head 36 or filter foot 34 be formed from possibly the same polysulfide plastics as the filter body 20. However, filter head and filter foot do not need to be porous to permit flow therethrough. The filter head 36 and filter foot 34, respectively, and the filter body 20 then expand to the same extent under thermal stress.

Basically, FIG. 5 shows the section through the filter element 30 at a position of the filter element 30 where the zig-zag-like first side walls 38 come close to each other. However, on the right side of FIG. 5 there is also shown, in broken lines, the outermost, underlying wall portion of the course. In this case, it is also shown how the through-flow passage 48 extends from a substantially rectangular flow cross section in the upper region of the filter head 36 into the interior of the filter element 30, which is advantageous in terms of flow. The transition extends from the innermost wall portions in funnel-shaped manner obliquely upwards in outward direction, while it extends from the outermost wall portions in substantially rectilinear manner or with a slight inclination only.

Figure 6:
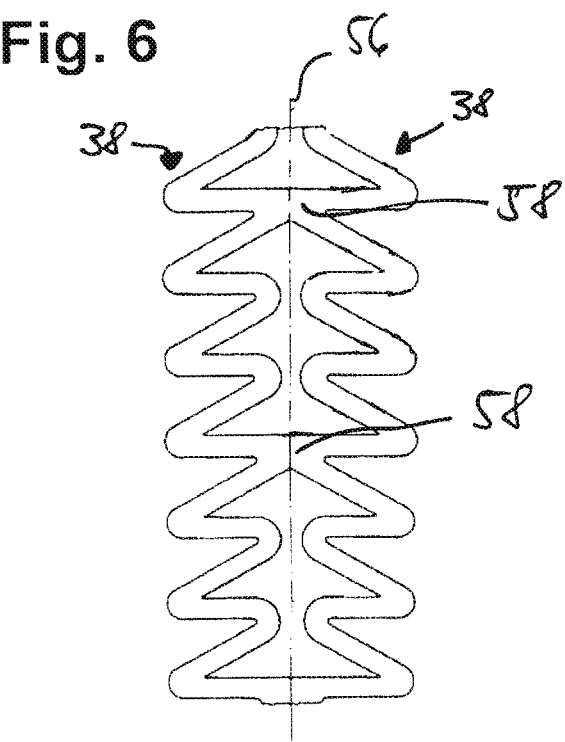
FIG. 6 shows a sectional view of the filter element at the position marked VI-VI in FIG. 4.

The sectional view shown in FIG. 6 illustrates in part two first side walls 38 and a narrow, second side wall 40. It can also be seen that the filter element 30 is formed from two halves 38, 38 which are joined together along their longitudinal axis 56. The two halves 38, 38 may be joined together by, for example, gluing, sintering, welding or otherwise. Of course, an integral manufacture of the filter element 30 is possible as well.

The two halves 38 and 38, except for the second narrow side walls 40, are also connected to each other between the same along wall portions 58, preferably from the filter head 36 to the filter foot 34. This leads to a subdivision into smaller, box-like elements or cells, which increases the strength of the filter element 30 in total, as the individual cells themselves already are of relatively high strength.

The first side walls 38 have a substantially zigzag-like course and are formed of successive first and second wall sections arranged following each other. FIG. 6 very nicely illustrates the "fir-tree" shape of the filter element 30, which forms a lamellar filter.

In addition to the box-like shape of the filter body shown in FIGS. 4 to 6, filter elements with differently shaped filter bodies are also possible, for example tubular filter elements in which the filter body has a substantially cylindrical shape.

EXAMPLES

In the following, there are indicated some examples of filter elements according to the invention:

Example 1

Coarse-grain plastics powder of polyphenylene sulfide (PPS) particles having an average grain size of 100 µm was thoroughly mixed and filled into a tempering mold. The PPS powder had the following properties: density according to ASTM D792: 1340 kg/m$^3$; water absorption at 23° C. per 24 h according to ASTM D570: 0.05%, tensile modulus according to ISO 527-2: 3400 MPa, melting point according to ISO 11357-3: 280° C.; glass transition temperature according to ISO 11357-2: 90° C. The tempering mold was vibrated during the filling in of the plastics particles.

The particles in powder form filled into the mold were tempered in an air circulating oven for 11 hours at a temperature of 270° C. in an ambient air environment. After tempering, discoloration of the polyphenylene sulfide particles to brown color could be observed. The particle size distribution of the polyphenylene sulfide particles did not change significantly by the tempering process.

For both the untempered particles and the tempered particles, the melt index was determined at 316° C. per 5 kg according to ASTM D 1238-13, Procedure B. This determination yielded a melt index of 100 g/10 min for the untempered polyphenylene sulfide particles. After tempering, the melt index of the filter body particles dropped so much that it was no longer measurable by the method used.

The tempered polyphenylene sulfide particles were filled, after cooling and re-sieving, into a sintering mold with dimensions of 300 mm×480 mm×4 mm. The average grain size of the polyphenylene sulfide particles was still 100 µm. The sintering mold was vibrated during filling to achieve a sufficiently dense packing of the polyphenylene sulfide particles. The polyphenylene sulfide particles filled into the sintering mold were then sintered in a sintering furnace for 60 min at a sintering temperature of 310° C.

Figure 7:
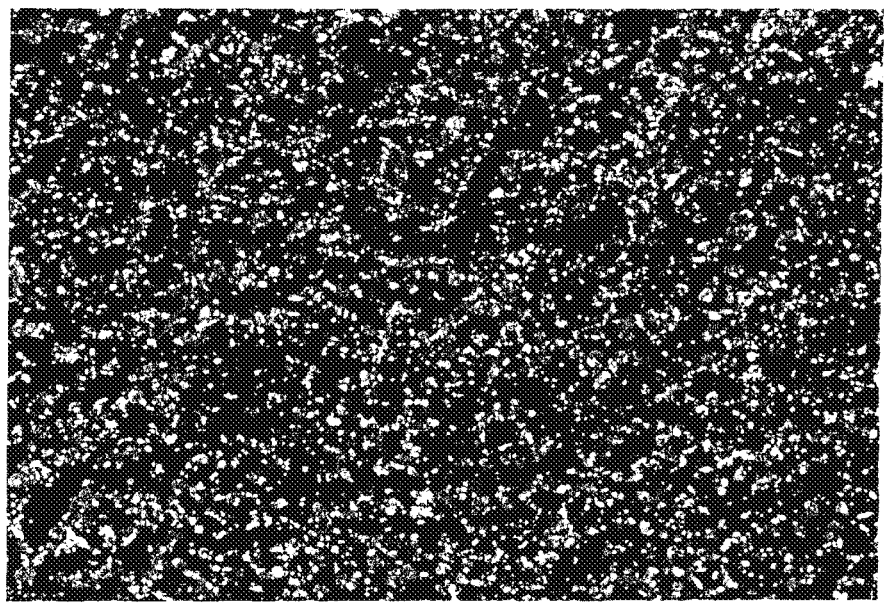
FIG. 7 shows a microscopic image of a sintered filter body according to the first example.

Upon removal from the sintering furnace, the sintered filter body plate was removed from the mold and tested for its mechanical properties. A micrograph of a section of the filter body plate after sintering at thirty times magnification is shown in FIG. 7.

Various test pieces were cut out from the plate and tested for mechanical properties or porosity.

A first test piece of 110 mm×10 mm was subjected to a tensile test according to DIN EN ISO 527-2 (2012-06) at a test speed of 80 mm/min. Here, a stress-strain diagram revealed a tensile strength of the test piece of 1.77 N/mm$^2$ and a maximum elongation of the test piece of 0.34 mm until breakage.

A determination of the pore size distribution on another test piece with dimensions of 250 mm×250 mm yielded a porosity of 65%.

Another test piece measuring 280 mm×280 mm was used to determine the pressure loss. In this case, a pressure loss of 1000 Pa was determined, measured with respect to a flow of air without foreign matter load at a volumetric flow rate of 12.011 m$^3$/(m$^2$×min) and with an air flow-through area of the test piece of 256 mm×256 mm.

Example 2

Coarse-grain plastics powder of polyphenylene sulfide (PPS) particles having an average grain size of 100 µm was thoroughly mixed and filled into a tempering mold. The PPS powder had the following properties: density according to ASTM D792: 1340 kg/m$^3$; water absorption at 23° C. per 24 h according to ASTM D570: 0.05%, tensile modulus according to ISO 527-2: 3400 MPa, melting point according to ISO 11357-3: 280° C.; glass transition temperature according to ISO 11357-2: 90° C. The tempering mold was vibrated while the plastics particles were filled in.

The particles in powder form filled into the mold were tempered in an air circulating oven for 11 hours at a temperature of 270° C. in an ambient air environment. After tempering, discoloration of the polyphenylene sulfide particles to brown color could be observed. The particle size distribution of the polyphenylene sulfide particles did not change significantly by the tempering process.

For both the untempered particles and the tempered particles, the melt index was determined at 316° C. per 5 kg according to ASTM D 1238-13, Procedure B. This determination yielded a melt index of 100 g/10 min for the untempered polyphenylene sulfide particles. After tempering, the melt index of the polyphenylene sulfide particles dropped so much that it was no longer measurable by the method used.

A mixture of 20 percent by weight of the untempered PPS particles and 80 percent by weight of the tempered PPS particles was prepared after cooling and re-sieving of the tempered polyphenylene sulfide particles. The average grain size of polyphenylene sulfide particles after sieving still was 100 μm. The mixture was filled into a sintering mold with dimensions of 300 mm×480 mm×4 mm. The sintering mold was vibrated during filling to achieve a sufficiently dense packing of the polyphenylene sulfide particle mixture. The polyphenylene sulfide particles filled into the sintering mold were then sintered in a sintering furnace for 60 minutes at a sintering temperature of 305° C.

After removal from the sintering furnace, the sintered filter body plate was removed from the mold and tested for its mechanical properties.

Various test pieces were cut out from the plate and tested for mechanical properties or porosity.

A first test piece of 110 mm×10 mm was subjected to a tensile test according to DIN EN ISO 527-2 (2012-06) at a test speed of 80 mm/min. Here, a stress-strain diagram revealed a tensile strength of the test piece of 4.46 N/mm$^2$ and a maximum elongation of the test piece of 0.44 mm until breakage.

A determination of the pore size distribution on another test piece with dimensions of 250 mm×250 mm yielded a porosity of 63%.

A further test piece measuring 280 mm×280 mm was used to determine the pressure loss. In this case, a pressure drop of 1160 Pa was determined, measured with respect to a flow of air without foreign matter load at a volumetric flow rate of 12.011 m$^3$/(m$^2$×min) and with an air flow-through area of the test piece of 256 mm×256 mm.

Example 3

Coarse-grain plastics powder of polyphenylene sulfide (PPS) particles having an average particle size of 100 μm was thoroughly mixed and filled into a tempering mold. The PPS powder had the following properties: density according to ASTM D792: 1340 kg/m$^3$; water absorption at 23° C. per 24 h according to ASTM D570: 0.05%, tensile modulus according to ISO 527-2: 3400 MPa, melting point according to ISO 11357-3: 280° C.; glass transition temperature according to ISO 11357-2: 90° C. The tempering mold was vibrated while the plastics particles were filled in.

The particles in powder form filled into the mold were tempered in an air circulating oven for 11 hours at a temperature of 270° C. in an ambient air environment. After tempering, discoloration of the polyphenylene sulfide particles to brown color could be observed. The particle size distribution of the polyphenylene sulfide particles had not changed significantly by the tempering process.

For both the untempered particles and the tempered particles, the melt index was determined at 316° C. per 5 kg according to ASTM D 1238-13, Procedure B. This determination yielded a melt index of 100 g/10 min for the untempered polyphenylene sulfide particles. After tempering, the melt index of the polyphenylene sulfide particle dropped so much that it was no longer measurable by the method used.

A mixture of 25% by weight of expanded glass globules and 75% by weight of the tempered polyphenylene sulfide particles was prepared after cooling and re-sieving of the polyphenylene sulfide particles. The average grain size of polyphenylene sulfide particles after sieving still was 100 microns. The mixture was filled into a sintering mold with the dimensions of 300 mm×480 mm×4 mm. The sintering mold was vibrated during filling to achieve a sufficiently dense packing of the mixture of polyphenylene sulfide particles/expanded glass globules. The polyphenylene sulfide particles filled into the sintering mold were then sintered in a sintering furnace for 60 min at a sintering temperature of 315° C.

After removal from the sintering furnace, the sintered filter body plate was removed from the mold and tested for its mechanical properties.

Various test pieces were cut out from the plate and tested for mechanical properties or porosity.

A first test piece of 110 mm×10 mm was subjected to a tensile test according to DIN EN ISO 527-2 (2012-06) at a test speed of 80 mm/min. Here, a stress-strain diagram revealed a tensile strength of the test piece of 3.71 N/mm$^2$ and a maximum elongation of the test piece of 0.39 mm until breakage.

A determination of the pore size distribution on a further test piece with dimensions of 250 mm×250 mm revealed a porosity of 52%.

Another test piece measuring 280 mm×280 mm was used to determine the pressure loss. In this regard, a pressure loss of 3030 Pa was determined, measured with respect to an air flow without foreign matter load at a volumetric flow rate of 12.011 m$^3$/(m$^2$×min) and with an air flow-through area of the test piece of 256 mm×256 mm.

The invention claimed is:

1. A filter element (30) being porous to permit flow therethrough, comprising a filter body (20) which forms a porous sintered structure and is constructed with filter body particles (10, 14) which are at least in part polysulfide particles (10), wherein:
   the polysulfide particles (10) contain a tempered polysulfide; and
   the tempering is carried out at a temperature of 255° C. to 275° C. over a period of time from 7 to 24 hours prior to sintering.

2. The filter element (30) of claim 1, wherein the polysulfide particles (10) are polyphenylene sulfide particles.

3. The filter element (30) of claim 1, wherein all filter body particles contain polysulfide.

4. The filter element (30) of claim 1, wherein at least part of the filter body particles consists of polysulfide.

5. The filter element (30) of claim 4, wherein all filter body particles consist of polysulfide.

6. The filter element of claim 1, wherein the polysulfide particles (10) contain at least two polysulfides of different configuration.

7. The filter element (30) of claim 1, wherein the filter body particles (10) have a melt flow index of at the most 500 g/10 min.

8. The filter element (30) of claim 1, wherein the polysulfide particles (10) contain unfilled polysulfide.

9. The filter element (30) of claim 1, wherein the polysulfide particles (10) contain at least one tempered polysulfide and at least one untempered polysulfide.

10. The filter element (30) of claim 1, which has a porosity of at least 30%.

11. The filter element (30) of claim 1, wherein the filter body (20) is formed such that the pressure loss across the filter element (30), measured with respect to an air flow without foreign matter load at a volumetric flow rate of 12.011 m$^3$/(m$^2$×min) and with an air flow-through area of the filter body (20) of 256 mm×256 mm with a thickness of 4 mm, is at the most 2000 Pa.

12. The filter element (30) of claim 1, wherein the polysulfide particles (10) have an average size of 50 to 500 μm.

13. The filter element (30) of claim 1, wherein the filter body (20) comprises, in addition to the polysulfide particles (10), particles that are not polysulfide particles.

14. The filter element (30) of claim 1, wherein the filter element (30), on an inflow side (22) thereof, is provided with a coating (24) constructed with additional particles (28), said coating (24) having a smaller pore size than the filter body (20).

15. The filter element (30) of claim 1, wherein the filter body (20) in a tensile test reveals a tensile strength of at least 1 N/mm$^2$.

16. The filter element (30) of claim 1, wherein the filter body (20) in a tensile test has an elongation at break of at least 0.2 mm.

17. The filter element (30) of claim 1, wherein the filter element is a lamellar filter element.

18. The filter element (30) of claim 17, further comprising a filter head (36) and a filter foot (34), which are constructed with the same material as the filter body (10).

19. The filter element (30) of claim 1, which is capable of withstanding a temperature in the range from 50 to 200° C.

20. A method of manufacturing a filter element (30) having inherent stability and being porous to permit flow therethrough, said method comprising steps of:

Providing filter body particles comprising polysulfide particles (10), at least part of said polysulfide particles tempered at a temperature of 255° C. to 275° C. over a period of time from 7 to 24 hours, and sintering the filter body particles to form a porous sintered filter body (20) of the filter element (30).

21. The method of claim 20, wherein the polysulfide particles are polyphenylene sulfide particles.

22. The method of claim 20, wherein the sintering takes place at ambient pressure.

23. The method of claim 20, wherein the sintering takes place at a temperature of 290° C. to 350° C.

24. The method of claim 23, wherein the sintering takes place over a period of time from 5 min to 180 min.

25. The method of claim 20, wherein at least two polysulfides of different configuration are used for providing the filter body particles.

26. The method of claim 25, wherein the provided filter body particles comprise tempered polysulfide and untempered polysulfide particles.

27. The filter element (30) of claim 16, wherein the tensile test is performed according to DIN EN ISO 527-2 (2012-06) at a test speed of 80 mm/min.

* * * * *